Dec. 20, 1932.  P. SPORN  1,891,736

METAL POLE FOR ELECTRIC POWER SYSTEMS

Filed Nov. 3, 1930  2 Sheets-Sheet 1

INVENTOR.
Philip Sporn
BY
Cromwell, Greist & Warden
his ATTORNEYS.

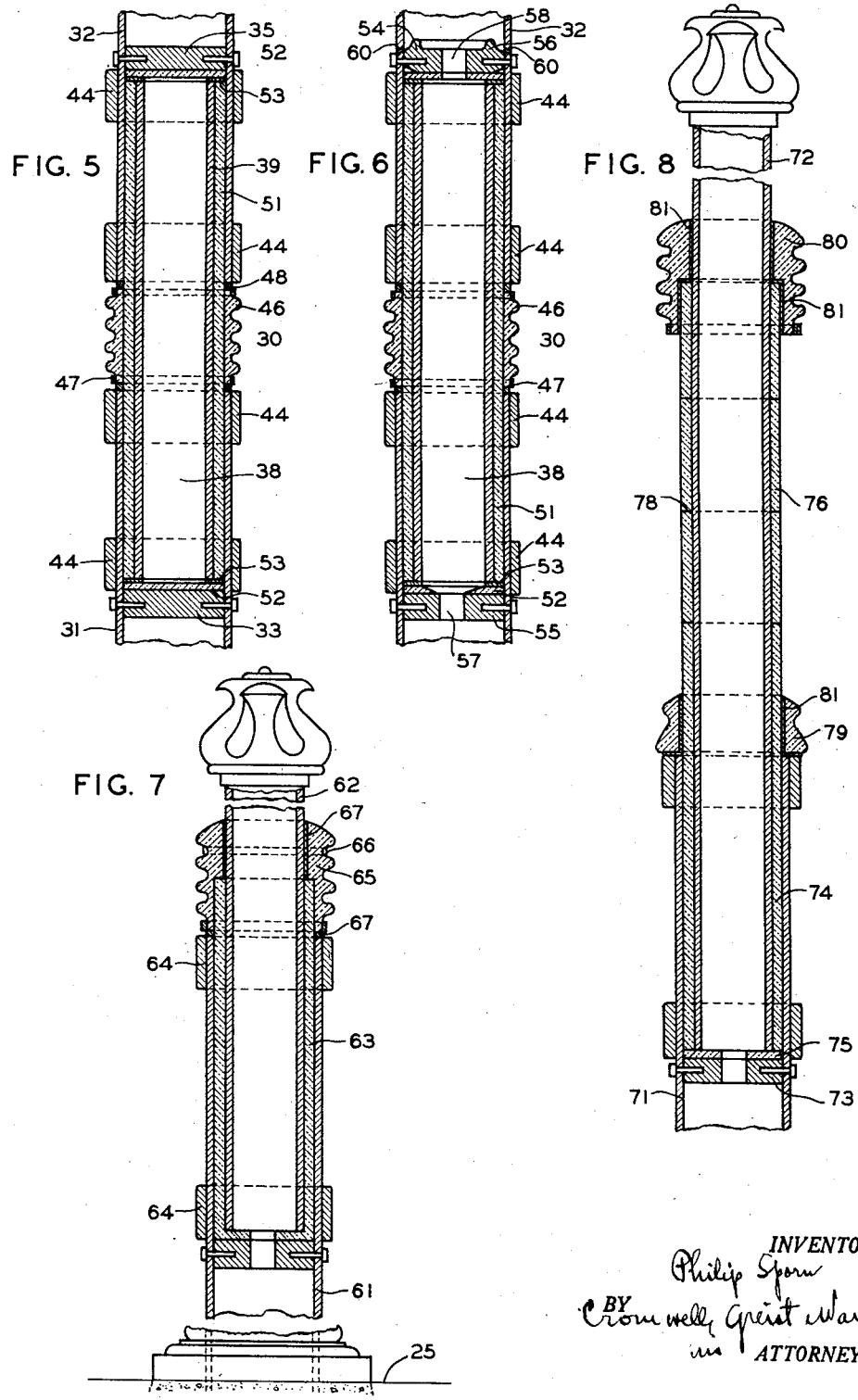

Patented Dec. 20, 1932

1,891,736

UNITED STATES PATENT OFFICE

PHILIP SPORN, OF NEW YORK, N. Y.

METAL POLE FOR ELECTRIC POWER SYSTEMS

Application filed November 3, 1930. Serial No. 492,992.

This invention relates to metal poles for electric power systems and has among its objects the provision of an improved metal pole construction which combines the rigidity, lightness and good appearance of standard steel poles with the safety to life and protection against high voltage characteristic of wooden poles.

The foregoing and other objects of the invention will be best understood from the following description of exemplifications thereof, reference being had to the accompanying drawings wherein.

Fig. 1 is an elevational view of a part of an electrical distribution system showing the improved pole and the power lines with the associated apparatus supported on the pole;

Fig. 2 is a vertical sectional view through a central portion of the pole illustrating the insulating junction between the upper section of the pole and the lower section of the pole;

Fig. 3 is a top view and Fig. 4 is a side elevation of the insulating bushing used to seal up the junction between the upper and lower pole sections;

Figs. 5 and 6 are vertical sectional views similar to Fig. 2 illustrating modified arrangements for insulatingly joining the upper and lower pole sections;

Fig. 7 is a vertical sectional view similar to Fig. 2 of a modified arrangement for insulatingly supporting the upper section of the pole on the lower section of the pole; and Fig. 8 is a partially elevational and partially sectional view of a still further modification of the pole construction embodying the invention.

The ultimate distribution of the electrical power in the consuming centers is usually effected by means of overhead distribution lines operating at moderately high voltages of about 2,000 to 5,000 volts. The majority of these distribution lines, particularly in less populated districts, are supported on wooden poles. In more populated sections, particularly in business districts, metal poles made of seamless steel tubing are generally used instead of wooden poles.

There are a number of reasons why such metal poles are preferable. The busier the street, the greater is usually the load. Consequently, the line and the associated equipment that are to carry the load become quite heavy. If wooden poles are used to carry such heavy load, they must be of large diameter. Such wooden poles are of uneven formation, difficult to properly paint and constitute clumsy and ugly pieces of equipment on the street.

Poles of seamless steel tubing have a great many advantages over wooden poles. By using steel it is possible to cut down the diameter of the pole and to have the pole straight and even. The steel pole adapts itself readily to ornamentation, as by a cap at the top and by an ornamental base; it may be properly painted and does not have to be taken out periodically for replacement. Further, steel poles stand up much better than wooden poles against sudden impacts due to collisions with carelessly driven automobiles or other vehicles.

There is however one great drawback in the use of steel poles and that is due to the absence of the insulating properties inherent in wooden poles. In the course of many years of operation and construction of electrical power systems it has become a firmly rooted and established practice for linemen to work hot on lines and equipment up to voltages of about 4,000 volts. A lineman who has to repair some defect on a line up to about 4,000 volts, or on a transformer or other piece of apparatus connected to such line, does not cut out the line from operation to make the repairs, but he climbs on the pole and makes the repair while the voltage is on. Where wooden poles are used the lineman can work on energized lines without danger, because the pole on which he stands is a very effective insulator against the ground and no substantial harm is done to the man reaching out for one of the lines while on the wooden pole. For example, on a wooden pole, if a 2,300-volt lead of a distribution transformer attached to the pole should become grounded, a not infrequent occurrence, and a lineman climbing on the pole should touch the transformer case, the lineman would receive only the static kick due to the charging current flowing through his body in charging it up to a potential of 2,300 volts above ground. This kick would not do him any harm and would not interfere with his further work. The wooden pole, by insulating him from the ground, would effectively prevent dynamic current from flowing through his body, thus eliminating danger to his life.

In a similar case, if a steel pole were employed and the transformer supported on the wooden cross-arm held on the pole, as is standard practice, the lineman standing on the steel pole would, on touching the transformer case, as he climbs up, be subject to the full action of the 2,300 volts and would as a rule be electrocuted by the dynamic current flowing through his body. Electrocution would also result if the lineman touched with his head, arm or any other part of his body a circuit carrying 2,300 volts or the like while standing on the steel pole.

Although the price of steel poles is about the same as that of wooden poles, their lack of the insulating properties of wooden poles acts so strongly against them that wherever possible, power companies prefer to carry their overhead lines on wooden poles. However, as stated before, in business and urban districts, the conditions compel the substitution of iron poles in lieu of wooden poles, notwithstanding the danger to the linemen involved in their use. It is due to these conditions and the practical necessity of using steel poles for supporting overhead lines of moderately high but dangerous voltages that there is a yearly toll of many deaths among linemen and service personnel who have to take care of repairs or maintenance of distributing lines supported on steel poles. The power distributing companies do their utmost to keep down such injuries to their employees, but notwithstanding all their efforts, it has up to now not been possible to provide sufficient safeguards to avoid the yearly toll of deaths resulting from the use of steel poles.

The present invention automatically removes the danger to the linemen working on steel pole supported power lines by providing in the pole an insulating member which insulates the upper section of the pole, on which the lineman stands while working on the hot lines, from the lower section of the steel pole which is mounted in the ground and is at ground potential. The dangerous voltage exists only in the elements supported on the upper portion of the pole where the various wires, transformers, cut-outs, lightning arresters, and other devices operating at dangerously high potential are carried. Accidental break-down of the insulation of any of these devices will often bring the outside of their casings to a dangerous potential above ground. However, contact of the lineman standing on the upper insulated portion of the metal pole with such device is not dangerous due to the fact that the insulating joint on the pole intervenes between the person making the contact and the ground. The use of an insulating joint in accordance with this invention makes substantially impossible the establishment of a circuit between the upper portion of the pole and the ground.

The drawings show several arrangements practically exemplifying the invention. In Fig. 1 is shown a steel pole 11 supporting three circuit conductors 12 of a three-phase city power distribution line which, for instance, may operate as a 4,000-volt "Y" system, so that the individual conductors are at a potential of about 2,300 volts above ground. The three conductors, as is usual, are shown held on insulators 13 which are mounted on a wooden crossarm 14 that is clamped to the upper end of the pole 11.

Below the upper crossarm 14 there is mounted a second wooden crossarm 15 which carries on a supporting frame 16 a distribution transformer 17 by means of which the voltage of the distribution lines 12 is transformed to 110–220 volts. Conductors 18 for the low voltage lines are carried on insulators 19 mounted on a rack 20 clamped to the pole between the two crossarms. Cut-outs 21 are mounted on the crossarm 15 and conductors 22 lead from the transformer 17 through the cut-outs 21 to the high voltage lines 12. Other conductors 23 lead from the low voltage side of the transformer 17 to the low voltage conductors 18 on the distribution rack of the pole.

The lower end of the pole is suitably secured within the ground 25 as by means of a concrete foundation embedded in the ground.

The pole is also shown provided with an ornamental base 26 and an ornamental cap 27 to secure good appearance.

Although, as shown in the drawings, the pole 11 has all the characteristics of an ordinary tubular pole as generally used heretofore, it distinguishes therefrom by the provision of a special insulating joint 30 which insulatingly separates the lower section 31 of the pole that is mounted in the ground from the upper pole section 32 which carries the live elements of the distribution system. The insulating joint 30 is so arranged that while effectively insulating the lower section of the pole against the line voltage it provides sufficient mechanical strength and rigidity between the lower and upper sections of the pole so that for all practical purposes the pole functions mechanically as if it were a continuous metallic pole.

The details of one form of such insulating joint are shown in Figs. 2 and 3. At the point of junction the lower end of the upper pole section 32 and the upper end of the lower pole section 31 are spaced from each other as shown in Fig. 2. A supporting block 33 is mounted within the interior of the lower pole section 31 a short distance from its upper end, the block being firmly secured in place as by means of bolts 34. In a similar way, a supporting block 35 is secured inside the upper pole section a short distance from its lower end, being also firmly held in place by bolts 34. There are thus provided two cylindrical, hollow spaces in the upper end of the lower pole section 31 and the lower end of the upper pole section 32. Into these spaces is slid a rigid core member 38 comprising a rigid metallic tube 39 having its exterior surrounded by an insulating shell formed of a lower shell half 41 and an upper shell half 42. The shell halves 41 and 42, which may be made of any suitable material, for instance, bakelite impregnated paper, have the shape of two cylindrical containers conforming to the shape of the core tube 39, the core tube and the insulating shells 41, 42 being so dimensioned that when the core is inserted into the hollow spaces at the adjoining ends of the two pole sections 31 and 32, the core fits these spaces and forms a rigid connection whereby the upper pole section 32 is firmly held on the lower pole section 31 so as to sustain both the weight of the upper section as well as the lateral bending stresses transmitted from the upper section. To increase firmness of the joint between the two pole sections 31 and 32 and the core member 38, clamp rings 44 are shrunk around the exterior of the portions of the two pole sections surrounding the core.

The two insulating shell halves 41, 42 form an insulating barrier between the metallic core tube 38 and the adjacent metallic portions of the upper pole section 32 and the lower pole section 31 so that the upper pole section 32 is electrically completely insulated from the lower pole section 31. The core member 38 is somewhat longer than the hollow space in the ends of the adjacent pole sections 31 and 32 so that upon assembly of the core member and the pole sections there is left a free space between the adjacent ends of the pole sections. The two insulating shell halves 41 and 42 meet in the space between the adjacent sections, thereby preventing any short circuit between the inner core tube 39 and the outer metallic tube sections due to accumulation of water drops or condensate. In order to protect the space around the insulating shells 41 and 42 against entrance of moisture, or influences tending to decrease their insulating strength, the space between the adjacent pole sections is enclosed and sealed up by means of an insulating shell 46, of porcelain for instance, shown in detail in Figs. 3 and 4. The porcelain shell 46 is made of two halves so that after the two pole sections with the core member 38 are assembled the two halves may be placed in position, the shell halves being tightly clamped around the core member by means of tie-bands 47 surrounding the upper and lower ends of the shell. Gaskets 48 of a suitable, relatively elastic packing material, such as rubber or vellumoid, are inserted at the junctions of the several parts to secure an effective seal against the entrance of moisture into the interior spaces at the junction of the two pole sections.

The insulating junction for rigidly holding the two pole sections may be made in many other forms. In the arrangement shown in Fig. 5 the core tube 39 is shown surrounded by an insulating sleeve 51 extending over the entire length of the core tube 39. The ends of the core tube are insulated from the supporting blocks 35 and 33 by the interposition of insulating disks 52 between the ends of the core tube 39 and the supporting blocks, and gaskets 53 of rubber or other insulating packing material are inserted between the abutting surfaces to seal off the spaces and prevent entrance of moisture.

Instead of solid supporting blocks used in the arrangements of Figs. 2 and 5, the arrangement of Fig. 6 employs supporting blocks 55 and 56 having central openings 57, 58 so as to permit threading of conductor cables or the like through the interior of the pole. Furthermore, as shown in the drawings, the upper supporting block 56 has in its upper side an annular ridge 59 which prevents accumulated condensate water trickling down on the interior walls of the upper pole section 32 from flowing to the interior of the lower section. The condensate accumulates in the space around the ridge 59 and flows out through holes 60 in the pole walls.

In the modification of the invention shown in Fig. 7 the lower pole section 61 is made like the lower pole section in the arrangement shown in Fig. 1, but the upper pole section 62 is made smaller in diameter corresponding approximately to the diameter of the core tube 39 of the insulating junction shown in Fig. 2. The upper section 62 is thus of a sufficiently smaller diameter to permit insertion of its lower end, with an insulating shell 63 surrounding it, into the open space formed in the upper end of the lower pole section 61. In this way a rigid insulating connection is provided between the lower pole section 61 and the upper pole section 62 without the employment of intermediary stress-transmitting core sections. Such construction is adequate for most uses since the moment acting on the upper section of the pole is smaller than that acting on the lower section and accordingly, a smaller pole cross-section is sufficient.

The overlapping pole sections are arranged to fit tightly within each other and clamping rings 64 may be provided to secure a very rigid joint. As a protection against the weather and moisture, the upper end of the lower pole section and the upper end of the insulating sleeve 63 are sealed off by means of an insulating shell 65 which is made in two halves, similarly to the insulating shell shown in Fig. 3, the halves being held together by clamp bands 66. The seal is completed by packing gaskets 67 inserted at the junctions between the several elements.

In all of the arrangements described above the insulating junction between the lower and upper pole sections is made at a height at which the upper pole section 32 is out of reach of persons passing by. In this way any danger to passers-by is completely eliminated. Furthermore, the parts carrying the electrically live elements of the system are placed on the upper pole section 32 at such height above the joint 30 that a lineman climbing on the pole cannot touch any of the parts that are likely to be live while still in contact with the lower section of the pole. In other words, the parts that are likely to become live are mounted so high on the upper pole section 32 of the pole that the lineman is positively insulated from the grounded section 31 when he reaches out for parts that may be live.

In the operation of power distribution lines it sometimes occurs that, due to some defect, a live part makes a direct conducting contact with the upper portion of the pole on which it is supported. In such case the life of a lineman may be endangered even with the improved pole construction of Figs. 1 to 7 described above if the lineman, in climbing on the pole and still supporting himself on the lower section, makes direct contact between the lower and upper pole sections. This difficulty is overcome by the form of invention shown in Fig. 8, in which the pole is constructed in general like in the arrangement shown in Fig. 7, and comprises a lower metallic pole section 71 and an upper metallic pole section 72. The upper section 72 is of smaller diameter than the lower pole section 71 and is fitted over a supporting block 73 in the interior of the hollow space formed at the upper end of the lower pole section 71 so that the two sections overlap, an insulating sleeve 74 and an insulating disk 75 being interposed between the adjacent portions of the two sections so as to completely insulate the same from each other.

In distinction from the construction shown in Fig. 7, the insulating sleeve 74 extends for a considerable length 76 above the upper end of the lower pole section 71. The length of the upwardly projecting portion 76 of the insulating sleeve 74 is made sufficiently long so that when a lineman cimbs upon the pole he can not make with his body any direct contact between the lower pole section 71 and the upper pole section 72. In other words, as long as the lineman supports himself on the lower pole section 71 he can reach with his body only parts of the upper pole section 72 that are covered by the upper extension of the insulating sleeve 74; and when he touches with his body the upper pole section 72, he must already be supporting himself on the portion of the upper pole section 72 that is covered with the upper extension of the insulating sleeve 74. The insulating sleeve 74 and its extension 76 may be made in the form of a single tubular body of suitable insulating material such as bakelite-impregnated tubing or the like. In order to prevent damage or breakage of the tubing due to lateral bending, the upper extension 76 of the tubing may be made in the form of short rings as indicated by the separating lines 78, suitable packing gaskets of rubber or the like being inserted between the adjoining ring surfaces. The upper ends of the lower pole section 71 and the upper end of the insulating sleeve extension 76 may be sealed up by insulator shells 79, 80 and packings 81 similar to the arrangements described in the previous figures.

By the use of the improved poles of the invention the yearly death toll of linemen engaged in repair and maintenance of metal-pole supported lines will be eliminated, and, in addition, one of the principal reasons for the reluctance to use the more desirable metal poles in place of wooden poles will be overcome.

The invention is not limited to the particular features of construction and the specific arrangements described for purposes of exemplification of the invention, as many other modifications will suggest themselves to those skilled in the art. It is accordingly desired that the appended claim be given a broad construction commensurate with the scope of the invention within the art.

What is claimed is:

A metal pole for supporting overhead portions of an electrical power distribution system operating at dangerous voltage comprising a tubular metallic lower section secured in the ground and extending upwardly to outside the reach of a person standing on the ground, a tubular metallic upper section of smaller diameter than said lower section inserted into the upper end of said lower section and extending upwardly to support the elements operating at a dangerous voltage, a metallic supporting member extending transversely into the hollow interior of the lower pole section from the inner walls thereof, at a short distance below its upper end, carrying the lower end of said upper pole section, insulating means associated with said supporting member insulating the lower end of the upper pole section from the portion of said lower section holding said support, and a sleeve of insulating material interposed between the opposing surfaces of the overlapped portions of said lower and upper pole sections and extending around said upper section for a distance above the upper edge of the lower section to hold said sections rigidly together while maintaining the same insulated from each other.

In testimony whereof I have hereunto subscribed my name, this 1st day of November, 1930.

PHILIP SPORN.